(12) United States Patent
Won

(10) Patent No.: US 10,471,970 B2
(45) Date of Patent: Nov. 12, 2019

(54) SAFETY APPARATUS FOR VEHICLE AND METHOD OF USING THE SAME

(71) Applicant: MANDO CORPORATION, Pyeongtaek-si, Gyeonggi-do (KR)

(72) Inventor: Gi Yeon Won, Suwon-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/179,259

(22) Filed: Nov. 2, 2018

(65) Prior Publication Data
US 2019/0135306 A1 May 9, 2019

(30) Foreign Application Priority Data
Nov. 3, 2017 (KR) .......................... 10-2017-0146225

(51) Int. Cl.
*B60W 50/14* (2012.01)
*G08G 1/16* (2006.01)
(Continued)

(52) U.S. Cl.
CPC ........ *B60W 50/14* (2013.01); *B60W 30/0956* (2013.01); *G06K 9/00805* (2013.01); *G08G 1/167* (2013.01); *B60W 2050/146* (2013.01)

(58) Field of Classification Search
CPC ............. B60W 50/14; B60W 30/0956; B60W 2050/146; G06K 9/00805; G08G 1/167
(Continued)

(56) References Cited

U.S. PATENT DOCUMENTS

| 9,583,003 B2* | 2/2017 | Shimizu | G08G 1/166 |
| 2011/0210866 A1* | 9/2011 | David | G08G 1/163 |
| | | | 340/903 |
| 2014/0097748 A1* | 4/2014 | Kato | B60Q 9/008 |
| | | | 315/77 |

FOREIGN PATENT DOCUMENTS

| JP | 2003-095046 A | 4/2003 |
| JP | 2003-95046 A | 4/2003 |

(Continued)

OTHER PUBLICATIONS

Korean Office Action dated Oct. 22, 2018 issued in Korean Patent Application No. 10-2017-0146225.
(Continued)

*Primary Examiner* — Steven Lim
*Assistant Examiner* — Mancil Littlejohn, Jr.
(74) *Attorney, Agent, or Firm* — Morgan, Lewis & Bockius LLP

(57) ABSTRACT

A safety apparatus of a vehicle and a method of using the same are disclosed. The safety apparatus provides safety to a pedestrian and a vehicle traveling in a lane next to parked vehicles in a blind spot formed by the parked vehicles. The safety apparatus for a vehicle includes a plurality of sensor, a controller, and a display. The sensors sense the presence and positions of a pedestrian and a traveling vehicle that are approaching the vehicle. The controller calculates a moving direction and moving speed of each of the pedestrian and the traveling vehicle using the result sensed by the plurality of sensors. The display displays the position, the moving direction, or the moving speed of the pedestrian or the traveling vehicle such that the displayed information is easily recognized by any object present in an external part.

12 Claims, 3 Drawing Sheets

(51) Int. Cl.
*G06K 9/00* (2006.01)
*B60W 30/095* (2012.01)

(58) Field of Classification Search
USPC .................................................. 340/425.5
See application file for complete search history.

(56) References Cited

FOREIGN PATENT DOCUMENTS

| | | | | |
|---|---|---|---|---|
| JP | 2003095046 A | * | 4/2003 | ............. B60Q 1/346 |
| JP | 2006-154933 A | | 6/2006 | |
| JP | 2006-209325 A | | 8/2006 | |
| KR | 10-2013-0134915 A | | 12/2013 | |
| KR | 2013-0134915 A | | 12/2013 | |
| KR | 10-2014-0086304 A | | 7/2014 | |
| KR | 10-2017-0069645 A | | 6/2017 | |
| WO | WO-2005092667 A1 | * | 10/2005 | ............. B60Q 5/006 |

OTHER PUBLICATIONS

Notice of Allowance issued in corresponding Korean Application No. 10-2017-0146225 dated Feb. 7, 2019, with English translation.

* cited by examiner

SAFETY APPARATUS FOR VEHICLE AND METHOD OF USING THE SAME

CROSS-REFERENCE TO RELATED APPLICATION

This application is based on and claims priority under 35 U.S.C. § 119 to Korean Patent Application No. 10-2017-0146225, filed on Nov. 3, 2017 in the Korean Intellectual Property Office, the disclosure of which is incorporated by reference in its entirety.

BACKGROUND

1. Field

Embodiments of the present disclosure relate to a safety apparatus for a vehicle and a method for using the same, and more particularly to a safety apparatus for providing safety to a pedestrian and a vehicle running on a lane next to parked vehicles in a blind spot formed by the parked vehicles, and a method for using the same.

2. Description of the Related Art

Various technologies capable of preventing traffic accidents from occurring in a blind spot have recently been intensively researched and developed. A representative example of the blind spot may include a street corner, crossroads, etc. In addition, many more blind spots may also be formed by other vehicles parked at a roadside or wayside, etc.

Blind spots formed by vehicles linearly parked at one end of a roadside may be considered extremely dangerous when pedestrians attempt to jaywalk across the road while simultaneously escaping from the spacing between the parked vehicles.

Specifically, when kids are playing or walking in the vicinity of parked vehicles, a driver of a vehicle traveling in a lane next to the parked vehicles may have difficulty in recognizing the presence or absence of kids who are playing or walking in the spacing between the parked vehicles because each kid has a shorter height than each parked vehicle.

The scope of target objects to be protected in such blind spots is not limited to humans, and may include animals such as dogs or cats as necessary. Since animals such as dogs or cats tend to enter a vehicle lane at a higher speed than humans, there is a higher possibility of collision between the vehicle and the animals.

As a result, the safety apparatus for providing safety to a pedestrian and a vehicle traveling in a lane next to parked vehicles in a blind spot formed by the parked vehicles located at a roadside is needed.

SUMMARY

Therefore, it is an aspect of the present disclosure to provide a safety apparatus for providing safety to a pedestrian and a vehicle traveling in a lane next to parked vehicles located at a roadside in a blind spot formed by the parked vehicles, and a method for using the same.

Additional aspects of the invention will be set forth in part in the description which follows and, in part, will be obvious from the description, or may be learned by practice of the invention.

In accordance with an aspect of the present disclosure, a safety apparatus for a vehicle includes a plurality of sensors configured to sense the presence and positions of a pedestrian and a traveling vehicle that are approaching the vehicle, a controller configured to calculate a moving direction and moving speed of each of the pedestrian and the traveling vehicle using the result sensed by the plurality of sensors, and a display configured to display the position, the moving direction, or the moving speed of the pedestrian or the traveling vehicle such that the displayed information is easily recognized by any object present in an external part.

The vehicle may be parked on a roadside. The display may be implemented as a plurality of indicator lights mounted to the vehicle. The indicator lights may include a roadway-nearby indicator light, a sidewalk-nearby indicator light, a front indicator light, and a rear indicator light. Since the indicator lights including the roadway-nearby indicator light, the sidewalk-nearby indicator light, the front indicator light, and the rear indicator light may operate independently from each other, the front indicator light and the rear indicator light are sequentially blinked or the rear indicator light and the front indicator light are sequentially blinked in response to a movement direction of the pedestrian such that the blinking action indicates the pedestrian who moves in a forward or backward direction. A blinking speed of the blinking action may be changed in response to the moving speed of the pedestrian.

The safety apparatus may further include a transmitter configured to transmit the position and moving speed of the pedestrian to the traveling vehicle, a front parked vehicle located in a forward region of the vehicle, or a rear parked vehicle located in a backward region of the vehicle.

The transmitter may transmit a signal or information for blinking the sidewalk-nearby indicator light when the pedestrian moves on a sidewalk. The transmitter may transmit a signal or information for blinking the roadway-nearby indicator light when the pedestrian moves toward the roadway. The transmitter may transmit a signal or information for blinking a sidewalk-nearby indicator light of the front parked vehicle when the pedestrian moves in a forward direction of the vehicle. The transmitter may transmit a signal or information for blinking a sidewalk-nearby indicator light of the rear parked vehicle when the pedestrian moves in a backward direction of the vehicle. Thus, the traveling vehicle may recognize the moving direction and moving speed of the pedestrian on the basis of not only an order of blinking the indicator lights of the vehicle, the front parked vehicle, and the rear parked vehicle, but also blinking speeds of the indicator lights.

The possibility of collision between the pedestrian and the traveling vehicle may be calculated. If there is a high possibility of collision between the pedestrian and the traveling vehicle, honking of at least one horn may be performed to warn the pedestrian of the presence of the approaching traveling vehicle.

If the traveling vehicle approaches the pedestrian, the indicator lights of the front parked vehicle located in a forward region in the moving direction of the pedestrian may be simultaneously blinked to inform the pedestrian of the approaching traveling vehicle.

In accordance with another aspect of the present disclosure, a method for using a safety apparatus of a vehicle includes discriminating between a sidewalk and a roadway using a plurality of sensors, and sensing the presence and positions of a pedestrian and a traveling vehicle that are approaching the vehicle, calculating a moving direction and moving speed of each of the pedestrian and the traveling vehicle using the result sensed by the plurality of sensors, and displaying the position, the moving direction, or the moving speed of the pedestrian or the traveling vehicle such that the displayed information is easily recognized by any object present in an external part.

The vehicle may be parked on a roadside. The display may be implemented as a plurality of indicator lights mounted to the vehicle. The indicator lights may include a roadway-nearby indicator light, a sidewalk-nearby indicator light, a front indicator light, and a rear indicator light. Since the indicator lights including the roadway-nearby indicator light, the sidewalk-nearby indicator light, the front indicator light, and the rear indicator light are configured to operate independently from each other, the front indicator light and the rear indicator light are sequentially blinked or the rear indicator light and the front indicator light are sequentially blinked in response to a movement direction of the pedestrian such that the blinking action indicates the pedestrian who moves in a forward or backward direction. A blinking speed of the blinking action may be changed in response to the moving speed of the pedestrian.

The method may further include transmitting the position and moving speed of the pedestrian to the traveling vehicle, a front parked vehicle located in a forward region of the vehicle, or a rear parked vehicle located in a backward region of the vehicle.

The method may further include transmitting a signal or information for blinking the sidewalk-nearby indicator light when the pedestrian moves on a sidewalk, transmitting a signal or information for blinking the roadway-nearby indicator light when the pedestrian moves toward the roadway, transmitting a signal or information for blinking a sidewalk-nearby indicator light of the front parked vehicle when the pedestrian moves in a forward direction of the vehicle, and transmitting a signal or information for blinking a sidewalk-nearby indicator light of the rear parked vehicle when the pedestrian moves in a backward direction of the vehicle, whereby the traveling vehicle recognizes the moving direction and moving speed of the pedestrian on the basis of not only an order of blinking the indicator lights of the vehicle, the front parked vehicle, and the rear parked vehicle, but also blinking speeds of the indicator lights.

The method may further include calculating a possibility of collision between the pedestrian and the traveling vehicle, and if there is a high possibility of collision between the pedestrian and the traveling vehicle, performing honking of at least one horn to warn the pedestrian of the presence of the approaching traveling vehicle.

The method may further include, if the traveling vehicle approaches the pedestrian, simultaneously blinking the indicator lights of the front parked vehicle located in a forward region in the moving direction of the pedestrian, thereby informing the pedestrian of the approaching traveling vehicle.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
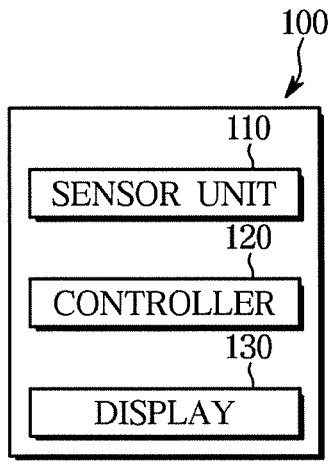
FIG. 1 is a block diagram illustrating a safety apparatus for a vehicle according to an embodiment of the present disclosure.

Reference will now be made in detail to the embodiments of the present disclosure, examples of which are illustrated in the accompanying drawings, wherein like reference numerals refer to like elements throughout. The embodiments of the present disclosure will hereinafter be described with reference to the attached drawings.

The scope or spirit of the present disclosure is not limited to the embodiments and may be realized in various other forms. The embodiments are only provided to more completely illustrate the present disclosure and to enable a person having ordinary skill in the art to fully understand the scope of the present disclosure.

FIG. 1 is a block diagram illustrating a safety apparatus for a vehicle according to an embodiment of the present disclosure.

Referring to FIG. 1, the safety apparatus 100 may include a sensor unit 110, a controller 120, and a display 130.

The sensor unit 110 may include a plurality of sensors to detect the presence and position of a pedestrian and a vehicle that are approaching parked vehicles located at a roadside. The categories and shapes of the sensor unit 110 are not limited thereto, and the sensor unit 110 may also be implemented as any other devices without departing from the scope and spirit of the present disclosure.

In more detail, the sensor unit 110 may include an ultrasonic sensor, an infrared sensor, a radar sensor, etc., or may also be implemented as a device provided with a GPS sensor capable of recognizing a GPS position of the pedestrian or the vehicle traveling in a lane.

It may be possible to make a distinction between a sidewalk and a roadway using the above-mentioned sensor unit 110. For this purpose, those skilled in the art may readily understand the technical concept in which the sensors of the present disclosure include a camera mounted to the vehicle.

For example, the controller 120 may be implemented as an electronic control unit (ECU) acting as one of electronic controllers of the vehicle. The ECU of the vehicle may be a component that is capable of controlling not only an automatic transmission but also almost all parts (i.e., a drive system, a brake system, a steering system, etc.) of the vehicle.

The controller 120 may calculate a moving direction and a moving speed of a pedestrian and a vehicle (hereinafter referred to as a traveling vehicle) traveling in a lane using the sensing result of the sensors 110.

The sensing result of the sensors may include all data needed to calculate the moving direction and moving speed of the pedestrian and the traveling vehicle.

In more detail, the sensing result may include GPS information about the position of the pedestrian, the position of each parked vehicle, and the position of the traveling vehicle. The GPS information indicating the positions of the pedestrian, each parked vehicle, and the traveling vehicle may be acquired by a GPS sensor.

The display 13 may include a plurality of indicator lights mounted to the vehicle. The indicator lights may include not only turn signal indicators (for example, a front indicator light, a rear indicator light, etc.), but also a side-view mirror light.

The display 130 may visually display a position, moving direction or moving speed of the pedestrian or the traveling vehicle such that the external object such as the pedestrian can recognize the displayed information.

Figure 2:
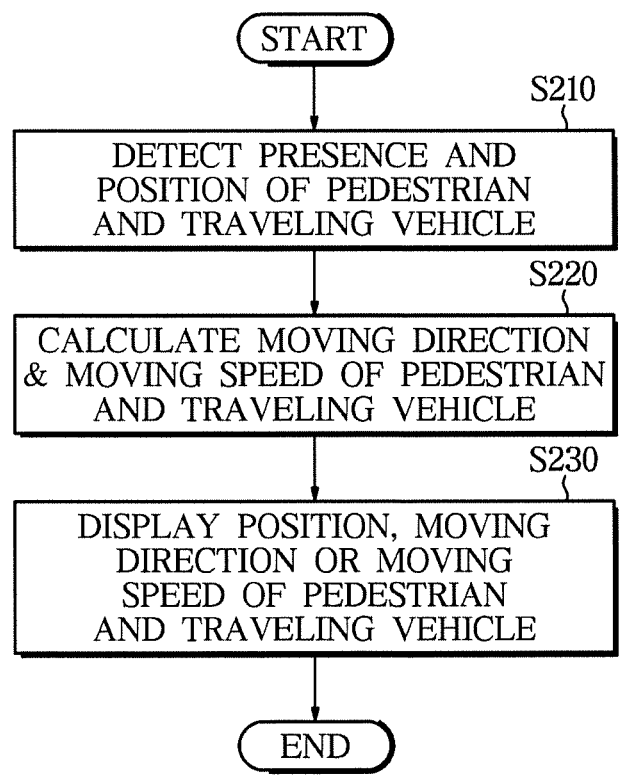
FIG. 2 is a flowchart illustrating a method for using the safety apparatus of the vehicle according to an embodiment of the present disclosure.

FIG. 2 is a flowchart illustrating a method for using the safety apparatus of the vehicle according to an embodiment of the present disclosure.

Referring to FIG. 2, a method for using the safety apparatus of the vehicle may include a sensing step S210, and a step S220 of calculating the moving direction and the moving speed of an object.

The method for using the safety apparatus of the vehicle according to the embodiment of the present disclosure may include a sensing step S210, a step S220 of calculating the moving direction and the moving speed of an object, and a display step S230.

In the sensing step S210, the safety apparatus may discriminate between a sidewalk and a roadway using a plurality of sensors, and may detect the presence and positions of a pedestrian and another vehicle that are approaching the vehicle (i.e., a host vehicle).

As described above, the categories and numbers of the sensors disclosed in the present disclosure are not limited thereto.

In more detail, the sensors may include an ultrasonic sensor, an infrared sensor, and a radar sensor, and may further include a forward-view camera and a rear-view camera.

In step S220, the safety apparatus may calculate the moving direction and moving speed of each of the pedestrian and the traveling vehicle using a control device such as an ECU.

In step S230, the safety apparatus may visually display the position, moving direction or moving speed of either the pedestrian or the traveling vehicle such that the external object can recognize the displayed information.

The technical idea of the present disclosure may effectively operate in an exemplary situation (hereinafter referred to as a first situation) in which a driver exited a parked vehicle, and may be implemented in a different way from another situation (hereinafter referred to as a second situation) in which the driver is driving the vehicle.

In more detail, whereas the indicator lights for use in the above-mentioned second situation in which the driver is driving the vehicle can operate along with the front indicator light and the rear indicator light that are located close to a sidewalk, the safety apparatus according to the present disclosure may independently control each of a front indicator light and a rear indicator light that are located close to a sidewalk such that the moving directions of the front and rear indicator lights can be displayed externally in a manner that the pedestrian present in an external part can recognize the displayed information.

Of course, a front indicator light and a rear indicator light that are located close to a roadway can also be controlled independently from each other in the same manner as in the other front and rear indicator lights located close to the sidewalk.

Figure 3:
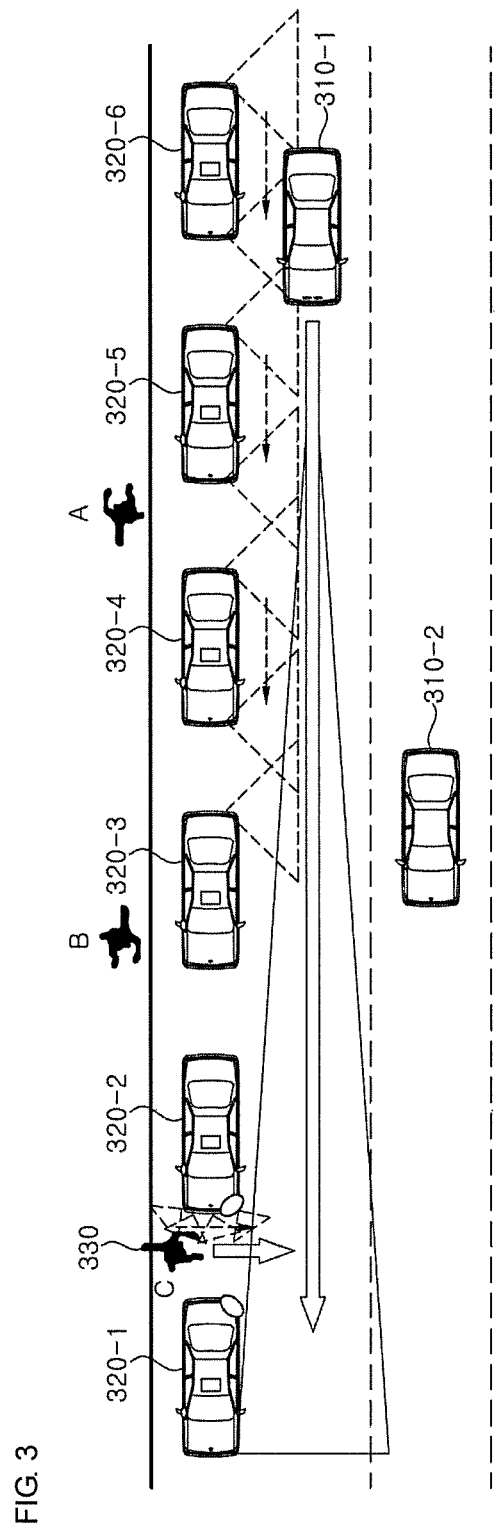
FIG. 3 is a conceptual diagram illustrating one example for using the safety apparatus of the vehicle according to an embodiment of the present disclosure.

FIG. 3 is a conceptual diagram illustrating one example for using the safety apparatus of the vehicle according to an embodiment of the present disclosure.

Referring to FIG. 3, a plurality of vehicles 320-1 to 320-6 may be parked on a shoulder of a road.

As can be seen from FIG. 3, two vehicles 310-1 and 310-2 are traveling in vehicle lanes next to the parked vehicles 320-1 to 320-6.

In addition, one pedestrian is moving from a sidewalk to the point A→point B→point C as illustrated in FIG. 3.

The present disclosure aims to prevent occurrence of traffic accidents capable of being encountered when the pedestrian or dog suddenly enters from a blind spot formed by a plurality of parked vehicles to a vehicle lane.

The display 130 according to the present disclosure may include a plurality of indicator lights mounted to the respective parked vehicles.

The display 130 may inform the driver of the traveling vehicle 310-1 of the presence and moving direction of the pedestrian using the plurality of indicator lights.

As described above, the indicator lights may include an indicator light nearest a roadway, an indicator light nearest a sidewalk, a front indicator light nearest the roadway, a front indicator light nearest the sidewalk, a rear indicator light nearest the roadway, and a rear indicator light nearest the sidewalk. Each of the indicator lights can be independently controlled.

In other words, when the pedestrian is approaching the point A, the sidewalk-nearby rear indicator light of one parked vehicle 320-4 may blink. Thereafter, since the pedestrian moves forward from the point A, the sidewalk-nearby indicator light of the parked vehicle 320-4 may blink.

Similarly, when the pedestrian then moves to the point B, the sidewalk-nearby rear indicator light of another parked vehicle 320-3 may blink. Subsequently, when the pedestrian continuously moves forward from the point B, the sidewalk-nearby front indicator light of another parked vehicle 320-3 may blink.

In addition, when the pedestrian who is located at the point C attempts to jaywalk across the road, the roadway-nearby rear indicator light of another parked vehicle 320-1 and the roadway-nearby front indicator light of another parked vehicle 320-2 may be simultaneously blinked, such that information indicating that the pedestrian or another object located between the parked vehicle 320-1 and the other parked vehicle 320-2 attempts to jaywalk across the road may be externally displayed such that the driver of the traveling vehicle traveling in a vehicle lane can recognize the displayed information.

Although the above-mentioned embodiment has exemplarily disclosed that the sidewalk-nearby indicator lights mounted to the plurality of parked vehicles are sequentially blinked in response to movement of the pedestrian who walks forward from the sidewalk for convenience of description and better understanding of the present disclosure, the scope or spirit of the present disclosure is not limited thereto, and it should be noted that the roadway-nearby indicator lights of the plurality of parked vehicles can also be properly blinked in response to movement of the pedestrian who walks forward from the sidewalk.

In more detail, even when the pedestrian walks on the sidewalk, the roadway-nearby indicator lights of the parked vehicles may be blinked such that the driver of the traveling vehicle traveling in the lane can easily recognize the presence of the pedestrian.

The present disclosure may allow the indicator lights to visually display not only the presence of the pedestrian or dog, but also the moving speed of the pedestrian or dog.

For example, the moving speed of the pedestrian or the like may be classified into five moving speed sections (i.e., first to fifth speed sections), such that the moving speed of the pedestrian may be higher in the order of the first speed section→the second speed section→the third speed section→the fourth speed section→the fifth speed section).

Generally, cats or dogs tend to very quickly jaywalk across the street without permission, such that the driver of the traveling vehicle traveling in the lane may have difficulty in avoiding roadkill accidents.

In order to avoid roadkill accidents, when a cat or dog is quickly moving from the sidewalk or roadway, the safety apparatus according to the present disclosure may allow indicator lights of the parked vehicles to be blinked with a blinking speed of the fifth speed section from among the five speed sections, such that the driver of the traveling vehicle traveling in the lane can easily recognize that a certain object moving at high speed is present in a blind spot formed by the parked vehicles, and the driver can drive the vehicle at a much lower speed for safe driving.

The safety apparatus for a vehicle according to the embodiments of the present disclosure may further include a transmitter that transmits the position and moving speed of the pedestrian to a traveling vehicle traveling in a lane, a front parked vehicle parked in a forward region of the traveling vehicle, or a rear parked vehicle parked in a backward region of the traveling vehicle.

The position, moving speed, or moving direction of the pedestrian may be calculated by a controller of the parked vehicle 320-4, such that the transmitter of the safety apparatus may transmit the calculated position, moving speed, or moving direction of the pedestrian to the front parked vehicle 320-3 or the rear parked vehicle 320-5.

In this way, if the pedestrian moves in a forward region of the parked vehicle 320-4, the transmitter may transmit a signal or information, which is needed to blink the sidewalk-nearby indicator light of the front parked vehicle 320-3, to the front parked vehicle 320-3. If the pedestrian moves in a backward direction of the parked vehicle 320-4, the transmitter may transmit a signal or information, which is needed to blink the sidewalk-nearby indicator light of the rear parked vehicle 320-5, to the rear parked vehicle 320-5. As a result, the front parked vehicle 320-3 or the rear parked vehicle 320-5 need not perform the process for initial sensing and the process for calculating the resultant values, such that safety measures against the dangerous situation can be more quickly carried out.

The safety apparatus according to the present disclosure may allow the driver of the traveling vehicle traveling in a lane to recognize the presence of a pedestrian who approaches the traveling vehicle, and may also allow the pedestrian to recognize the presence of the traveling vehicle approaching the pedestrian.

In more detail, when the traveling vehicle approaches the pedestrian, the plurality of indicator lights mounted to the parked vehicles located in a forward region of the traveling vehicle may be simultaneously blinked such that the pedestrian can recognize the presence of the approaching traveling vehicle.

Moreover, the safety apparatus according to the present disclosure may calculate the possibility of collision between the pedestrian and the traveling vehicle. If there is a high possibility of collision between the pedestrian and the traveling vehicle, the safety apparatus may warn the pedestrian of the approaching traveling vehicle by honking horns.

Figure 4:
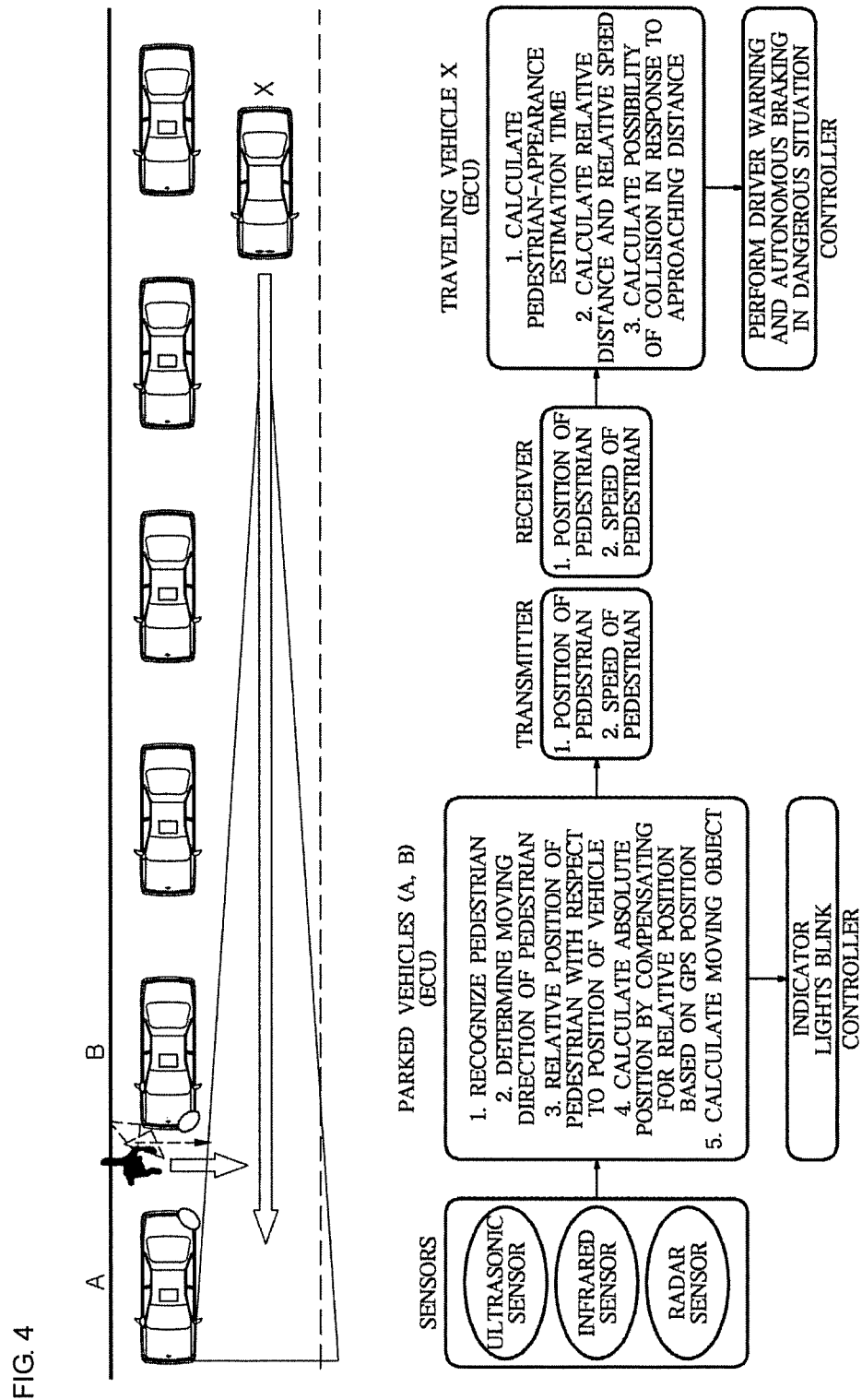
FIG. 4 is a conceptual diagram illustrating a safety apparatus of a vehicle according to another embodiment of the present disclosure.

FIG. 4 is a conceptual diagram illustrating a safety apparatus of a vehicle according to another embodiment of the present disclosure.

When the pedestrian who is located between a first parked vehicle A and a second parked vehicle B attempts to jaywalk across the road, the embodiment of FIG. 4 may calculate the possibility of traffic accidents caused by such jaywalking, and may prevent traffic accidents in advance using the calculated result.

The first parked vehicle A and the second parked vehicle B may sense associated data using sensors mounted to the parked vehicles A and B, or may receive associated data indicating the sensing result detected by external parts over a wireless network, such that the first parked vehicle A and the second parked vehicle B may recognize the pedestrian and the traveling vehicle based on the received data, and may calculate a relative position of the pedestrian with respect to the position of each parked vehicle A or B.

The safety apparatus according to another embodiment of the present disclosure may compensate for the relative position of the pedestrian on the basis of a GPS position acquired by a GPS sensor, such that the safety apparatus may also calculate an absolute position of the pedestrian. A controller (e.g., ECU) of each of the parked vehicles A and B may calculate the moving direction and moving speed of the pedestrian and another vehicle X, and may control indicator lights of the parked vehicles A and B to blink such that the pedestrian and the driver of the vehicle X (i.e., the traveling vehicle X) can recognize the blinking indicator lights. A transmitter of each of the parked vehicles A and B may transmit the position and moving speed of the pedestrian to the receiver of the vehicle X.

A controller (e.g., ECU) of the vehicle X may calculate an appearance estimation time at which the pedestrian will appear in a forward region of the vehicle X, and may calculate a relative distance and a relative speed between the pedestrian and the vehicle X, such that the controller of the vehicle X may calculate the possibility of collision between the pedestrian and the vehicle X based on the calculated information.

If there is a high possibility of collision between the pedestrian and the vehicle X, the controller of the vehicle X may audibly warn the driver of the vehicle X of the high possibility of collision, and may operate an autonomous braking device in a manner that the vehicle X can be automatically stopped without intervention of the driver who drives the vehicle X.

As is apparent from the above description, the safety apparatus of a vehicle and a method of using the same according to the embodiments of the present disclosure can provide safety to a pedestrian and a vehicle traveling in a lane next to parked vehicles in a blind spot.

The safety apparatus and the method using the same according to the embodiments of the present disclosure can allow pedestrians who are present in a blind spot to pre-recognize the presence of a vehicle that approaches the pedestrians while being hidden from parked vehicles located at a roadside, such that the vehicle approaching the blind slot can greatly reduce the possibility of collision with other objects.

The safety apparatus and the method of using the same according to the embodiments of the present disclosure can utilize low-priced sensors mounted to a conventional vehicle, and can solve standby power issues encountered by widespread use of electric vehicles.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A safety apparatus for a parked vehicle on a roadside, comprising:
   a plurality of sensors configured to sense the presence and positions of a pedestrian and a traveling vehicle that are approaching the parked vehicle;
   a controller configured to calculate a moving direction and moving speed of each of the pedestrian and the traveling vehicle using a result of sensing by the plurality of sensors; and
   a display configured, to display the position, the moving direction, or the moving speed of the pedestrian or the traveling vehicle such that the displayed information is easily recognized by any object present in an external part,
   wherein the display comprises a plurality of indicator lights of the parked vehicle, the indicator lights including a roadway-nearby indicator light, a sidewalk-nearby indicator light, a front indicator light, and a rear indicator light that are configured to operate independently from each other, and
   the front indicator light and the rear indicator light are sequentially blinked or the rear indicator light and the front indicator light are sequentially blinked in response to the moving direction of the pedestrian such that a blinking action indicates the moving direction of the pedestrian in a forward or backward direction.

2. The safety apparatus according to claim 1,
   wherein the display is configured to change a blinking speed of the blinking action in response to the moving speed of the pedestrian.

3. The safety apparatus according to claim 1, further comprising:
   a transmitter configured to transmit the position and moving speed of the pedestrian to the traveling vehicle, a front parked vehicle located in a forward region of the parked vehicle, or a rear parked vehicle located in a backward region of the parked vehicle.

4. The safety apparatus according to claim 3, wherein:
   the transmitter transmits a signal or information for blinking the sidewalk-nearby indicator light when the pedestrian moves on a sidewalk;
   the transmitter transmits a signal or information for blinking the roadway-nearby indicator light when the pedestrian moves toward the roadway;
   the transmitter transmits a signal or information for blinking a sidewalk-nearby indicator light of the front parked vehicle when the pedestrian moves in a forward direction of the parked vehicle; and
   the transmitter transmits a signal or information for blinking a sidewalk-nearby indicator light of the rear parked vehicle when the pedestrian moves in a backward direction of the parked vehicle,
   whereby the traveling vehicle recognizes the moving direction and moving speed of the pedestrian on the basis of not only an order of blinking of the indicator lights of the parked vehicle, the front parked vehicle, and the rear parked vehicle, but also blinking speeds of the indicator lights.

5. The safety apparatus according to claim 1, wherein:
   a possibility of collision between the pedestrian and the traveling vehicle is calculated, and
   if there is a high possibility of collision between the pedestrian and the traveling vehicle, honking of at least one horn is carried out to warn the pedestrian of the presence of the approaching traveling vehicle.

6. The safety apparatus according to claim 1, wherein:
   if the traveling vehicle approaches the pedestrian, the indicator lights of the front parked vehicle located in a forward region in the moving direction of the pedestrian are simultaneously blinked to inform the pedestrian of the approaching traveling vehicle.

7. A method for using a safety apparatus of a parked vehicle on a roadside, comprising:
   discriminating between a sidewalk and a roadway using a plurality of sensors, and sensing the presence and positions of a pedestrian and a traveling vehicle that are approaching the parked vehicle;
   calculating a moving direction and moving speed of each of the pedestrian and the traveling vehicle using a result of the sensing by the plurality of sensors; and
   displaying the position, the moving direction, or the moving speed of the pedestrian or the traveling vehicle such that displayed information is easily recognized by any object present in an external part,
   wherein the displaying the position, the moving direction, or the moving speed of the pedestrian or the traveling vehicle such that the displayed information is easily recognized by any object present in the external part includes sequentially blinking a front indicator light and a rear indicator light or sequentially blinking the rear indicator light and the front indicator light in response to the moving direction of the pedestrian such that a blinking action indicates the moving direction of the pedestrian in a forward or backward direction.

8. The method according to claim 7, wherein:
   the displaying the position the moving direction, or the moving speed of the pedestrian or the traveling vehicle such that the displayed information is easily recognized by any object present in the external part includes changing a blinking speed of the blinking action in response to the moving speed of the pedestrian.

9. The method according to claim 7, further comprising:
   transmitting the position and moving speed of the pedestrian to the traveling vehicle, a front parked vehicle located in a forward region of the parked vehicle, or a rear parked vehicle located in a backward region of the parked vehicle.

10. The method according to claim 9, further comprising:
    transmitting a signal or information for blinking a sidewalk-nearby indicator light when the pedestrian moves on a sidewalk;
    transmitting a signal or information for blinking a roadway-nearby indicator light when the pedestrian moves toward the roadway;
    transmitting a signal or information for blinking a sidewalk-nearby indicator light of the front parked vehicle when the pedestrian moves in a forward direction of the parked vehicle; and
    transmitting a signal or information for blinking a sidewalk-nearby indicator light of the rear parked vehicle when the pedestrian moves in a backward direction of the parked vehicle,
    whereby the traveling vehicle recognizes the moving direction and moving speed of the pedestrian on the basis of not only an order of blinking of the indicator lights of the parked vehicle, the front parked vehicle, and the rear parked vehicle, but also blinking speeds of the indicator lights.

11. The method according to claim 7, further comprising:
    calculating a possibility of collision between the pedestrian and the traveling vehicle; and
    if there is a high possibility of collision between the pedestrian and the traveling vehicle, performing honking of at least one horn to warn the pedestrian of the presence of the approaching traveling vehicle.

12. The method according to claim 7, further comprising:
if the traveling vehicle approaches the pedestrian, simultaneously blinking the indicator lights of the front parked vehicle located in a forward region in the moving direction of the pedestrian, thereby informing the pedestrian of the approaching traveling vehicle.

\* \* \* \* \*